United States Patent
Tonkin et al.

(10) Patent No.: US 10,774,802 B2
(45) Date of Patent: Sep. 15, 2020

(54) INTAKE AIR HEATING SYSTEM FOR A VEHICLE

(71) Applicant: Phillips & Temro Industries Inc., Eden Prairie, MN (US)

(72) Inventors: Steven W. Tonkin, Eden Prairie, MN (US); Jeremy N. Douglas, Chanhassen, MN (US); Roger J. Halberg, Savage, MN (US)

(73) Assignee: Phillips & Temro Industries Inc., Eden Prairie, MN (US)

( * ) Notice: Subject to any disclaimer, the term of this patent is extended or adjusted under 35 U.S.C. 154(b) by 352 days.

(21) Appl. No.: 15/594,746

(22) Filed: May 15, 2017

(65) Prior Publication Data

US 2018/0328332 A1  Nov. 15, 2018

(51) Int. Cl.

| | |
|---|---|
| *F02M 31/13* | (2006.01) |
| *H05B 3/06* | (2006.01) |
| *F02M 35/10* | (2006.01) |
| *F02N 19/04* | (2010.01) |
| *H05B 1/02* | (2006.01) |

(52) U.S. Cl.
CPC ............ *F02N 19/04* (2013.01); *F02M 31/13* (2013.01); *H05B 1/0236* (2013.01); *H05B 3/06* (2013.01); *F02M 35/10268* (2013.01); *H05B 2203/023* (2013.01); *H05B 2203/024* (2013.01)

(58) Field of Classification Search
USPC .......... 219/553, 552, 67; 422/175, 174, 177, 422/179, 180; 60/300
See application file for complete search history.

(56) References Cited

U.S. PATENT DOCUMENTS

| | | |
|---|---|---|
| 4,604,946 A | 8/1986 | Watanabe |
| 4,669,181 A | 6/1987 | Porzky |
| 5,019,797 A | 5/1991 | Marstiller et al. |
| 5,388,594 A | 2/1995 | Counts et al. |
| 5,666,978 A | 9/1997 | Counts et al. |
| 5,692,291 A | 12/1997 | Deevi et al. |
| 5,708,258 A | 1/1998 | Counts et al. |
| 5,750,964 A | 5/1998 | Counts et al. |
| 5,928,549 A | 7/1999 | Hitzigrath |

(Continued)

FOREIGN PATENT DOCUMENTS

| | | |
|---|---|---|
| DE | 102007045196 A1 | 11/2008 |
| EP | 0595076 A2 | 5/1994 |

(Continued)

OTHER PUBLICATIONS

Metal Supermarkets "Which Metals Conduct Electricity?" (Year: 2015).*

(Continued)

*Primary Examiner* — Michael G Hoang
*Assistant Examiner* — Bonita Khlok
(74) *Attorney, Agent, or Firm* — Harness, Dickey & Pierce, P.L.C.

(57) ABSTRACT

An air intake assembly includes heating elements. The heating elements include windings arranged in a serpentine configuration and having crest portions and trough portions. At least one crest portion of a first heating element is fastened to a corresponding trough portion of a second heating element. The heating elements are arranged in a honeycomb configuration.

20 Claims, 6 Drawing Sheets

(56) References Cited

U.S. PATENT DOCUMENTS

| | | |
|---|---|---|
| 6,040,557 A | 3/2000 | Prust et al. |
| 6,049,063 A | 4/2000 | Barber |
| 6,242,712 B1 | 6/2001 | Prust |
| 6,544,623 B1* | 4/2003 | Straza .................. B23K 1/0014 428/116 |
| 6,666,978 B2 | 12/2003 | Steinel |
| 6,732,940 B2 | 5/2004 | Enander et al. |
| 6,817,283 B2 | 11/2004 | Jones et al. |
| 6,931,205 B2 | 8/2005 | Atkins |
| 7,007,857 B2 | 3/2006 | Enander et al. |
| 7,361,868 B2 | 4/2008 | Otto et al. |
| 7,424,848 B2 | 9/2008 | Jones et al. |
| 7,464,671 B2 | 12/2008 | Harth, III |
| 7,495,195 B2 | 2/2009 | Tung et al. |
| 7,627,234 B2 | 12/2009 | Pierron et al. |
| 7,637,233 B2 | 12/2009 | Albrecht et al. |
| 7,708,553 B2 | 5/2010 | Hockaday et al. |
| 7,777,161 B2 | 8/2010 | Zeyen et al. |
| 8,071,914 B2 | 12/2011 | Azuma |
| 8,186,656 B2 | 5/2012 | Fujii et al. |
| 8,397,795 B2 | 3/2013 | Seto |
| 8,585,396 B2 | 11/2013 | Hockaday et al. |
| 8,679,413 B2 | 3/2014 | Ishihara |
| 9,447,964 B2 | 9/2016 | Hockaday et al. |
| 2007/0007274 A1* | 1/2007 | Aloup ...................... H05B 3/10 219/444.1 |
| 2015/0282258 A1* | 10/2015 | Park ..................... H05B 6/6494 219/731 |
| 2017/0234275 A1* | 8/2017 | Sellnau ................ F02M 31/135 123/549 |

FOREIGN PATENT DOCUMENTS

| | | | |
|---|---|---|---|
| EP | 1821573 A2 | 8/2007 | |
| JP | 201768977 | * 4/2017 | ............... H05B 3/10 |
| JP | 2017068977 A | 4/2017 | |

OTHER PUBLICATIONS

Google translation "volume" (Year: 2016).*
JP201768977 translation (Year: 2017).*

* cited by examiner

INTAKE AIR HEATING SYSTEM FOR A VEHICLE

FIELD

The present disclosure relates to intake air heating systems in internal combustion engines and more particularly to an air intake assembly having a heating coil and electronic control of intake air heating systems incorporating the air intake assembly.

BACKGROUND

An air-fuel mixture for an internal combustion engine is harder to ignite when cold, leading to less complete combustion and increased emissions. Once the engine has warmed up, the cylinders may warm the air-fuel mixture sufficiently. However, at startup, the engine may have no heat to contribute to the air-fuel mixture. Cold start conditions are especially severe when the ambient air temperature is low. An intake air heating system may be used to heat air arriving at the engine. This system may be located within or prior to the intake manifold. The intake air heating system may be brought up to temperature prior to attempting to start the engine.

Heating the intake air may allow for easier ignition and may hold the fuel in suspension more effectively, leading to fewer fuel droplets falling out of suspension in the air. Intake air heating systems may allow for faster starts of the engine, may reduce startup emissions, reduce engine wear, reduce overall battery consumption during startup, and reduce startup fuel consumption.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air intake assembly includes heating elements. The heating elements include windings arranged in a serpentine configuration and having crest portions and trough portions. At least one crest portion of a first heating element is fastened to a corresponding trough portion of a second heating element. The heating elements are arranged in a honeycomb configuration.

In other features, a length of the first heating element includes a length of the second heating element and a resistance of the first heating element includes a resistance of the second heating element. In other features, a length of the first heating element includes a range of between thirty centimeters to fifty centimeters. In other features, a thickness of the first heating element includes a thickness of the second heating element. In other features, the thickness of the first heating element includes a range between twenty thousandths of a centimeter to thirty thousandths of a centimeter. In other features, wherein a width of the first heating element includes a width of the second heating element.

In other features, crest portions of the first heating element are welded to corresponding trough portions of the second heating element to form interfaces. In other features, a length between a first interface and a second interface formed includes a length between the second interface and a third interface.

An air heater assembly includes a first heating element that includes windings arranged in a serpentine configuration and including crest portions and trough portions. The air heater assembly includes a second heating element including windings arranged in a serpentine configuration and including crest portions and trough portions. A crest portion of the second heating element is fastened to a trough portion of the first heating element. The air heater assembly includes a third heating element including windings arranged in a serpentine configuration and including crest portions and trough portions. A crest portion of the third heating element is fastened to a trough portion of the second heating element. The first heating element, the second heating element, and the third heating element are arranged in a honeycomb configuration.

In other features, a length of the first heating element includes a length of the second heating element and a length of the third heating element, and a resistance of the first heating element includes a resistance of the second heating element and a resistance of the third heating element. In other features, the length of the first heating element includes a range of between thirty centimeters to fifty centimeters.

In other features, a thickness of the first heating element includes a thickness of the second heating element and a thickness of the third heating element. In other features, the thickness of the first heating element includes a range between twenty thousandths of a centimeter to thirty thousandths of a centimeter.

In other features, a width of the first heating element includes a width of the second heating element and a width of the third heating element. In other features, the width of the first heating element includes a range between one centimeter and three centimeters.

In other features, the first heating element, the second heating element, and the third heating element include stainless steel.

An intake air heating system for a vehicle includes a heater coil that includes heating elements. The heating elements include windings arranged in a serpentine configuration and include crest portions and trough portions. A crest portion of a first heating element is fastened to a trough portion of a second heating element. The heating elements are arranged in a honeycomb configuration. The intake air heating system includes an air heater controller that is configured to selectively connect a battery of the vehicle to the heater coil in contact with intake air of the vehicle. The controller is configured to, in response to an enable signal from an engine controller, connect the battery to the heater coil to provide voltage to the heater coil and receive a resistance measurement indicative of a temperature of the heater coil. The controller is configured to, in response to the temperature of the heater coil exceeding or being equal to a predetermined temperature, adjust the voltage provided to the heater coil.

In other features, a crest portion of the first heating element is welded to a trough portion of a second heating element. In other features, a length of the first heating element includes a length of the second heating element, and a thickness of the first heating element includes a thickness of the second heating element. In other features, the length of the first heating element includes a range of between thirty centimeters to fifty centimeters, and the thickness includes a range between twenty thousandths of a centimeter to thirty thousandths of a centimeter.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Currently, air heaters take many seconds to heat to a temperature such that the heat generated by the air heater can sufficiently heat the intake air of an engine, such as a diesel engine. The present disclosure is directed to an air heater that includes relatively shorter heating elements arranged in a honeycomb structure to lower heat up time and provide a durable construction that mitigates damage to the heating elements from over-temperature or vibration. The air heater may also fill an air intake path, or throat, of the engine intake to minimize cold spots.

The present disclosure is also directed to an air heater controller that is able to determine the air heater temperature and control the current provided to the air heater to reach and maintain a desired operating temperature. In this way, even if the engine controller actuates the air heater system for longer than necessary, the air heater will not reach an over-temperature condition.

The air heater controller can receive signals from a temperature sensor representing a temperature of a heater coil employed within the air heater. The temperature sensor can measure a change in heater coil resistance, and the change in temperature can be used to determine a temperature of the heater coil. For example, change in heater coil resistance from a cold ambient starting temperature to operating temperature may be used to infer temperature and control the heating coil accordingly. Measuring resistance is generally performed by measuring voltage and current and calculating their ratio.

Figure 1:
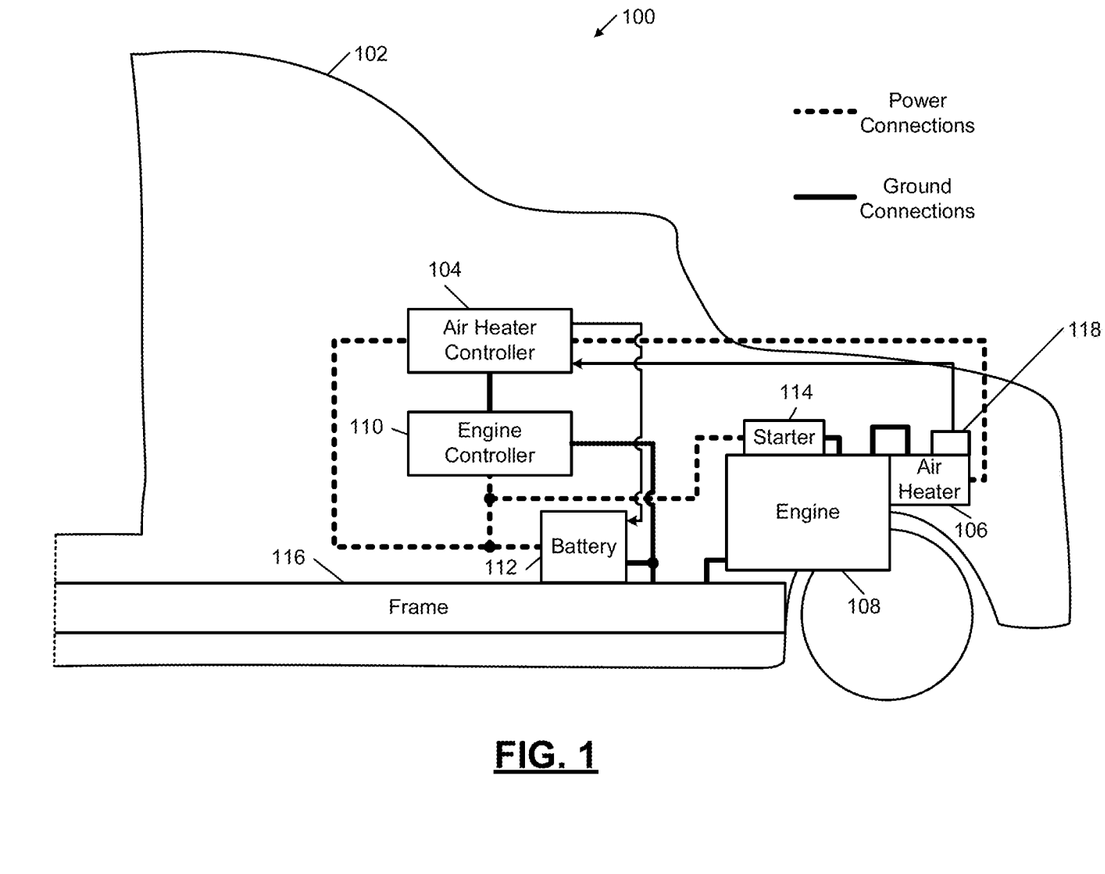
FIG. 1 is a functional block diagram of an example intake air heating system for a vehicle according to the principles of the present disclosure.

FIG. 1 illustrates an intake air heating system 100 including selected ground and power connections in a truck 102 configured with an air heater controller 104 and an air heater 106, according to the principles of the present disclosure. The air heater 106 selectively heats air being provided to an engine 108. The air heater controller 104 may be activated by an engine controller 110. The air heater controller 104 supplies voltage to the air heater 106 from a battery 112. A starter 114 selectively rotates the crankshaft of the engine 108 and is also powered by the battery 112.

As seen by the dashed line, the battery 112 provides power to the starter 114, to the engine controller 110, and to the air heater controller 104, which selectively connects that power to the air heater 106. Meanwhile, the solid lines show the ground connections of the battery to a frame 116 of the truck 102 as well as to the engine controller 110. In some vehicles, the engine 108 is grounded to the frame 116. This is simply one grounding configuration shown for example, and the principles of the present disclosure are not limited to this configuration.

The intake air heating system 100 includes a temperature sensor 118 that measures the temperature of the air heater 106. For instance, the temperature sensor 118 measures a change in heater coil resistance from a cold ambient starting temperature to operating temperature. The change in resistance is provided to the air heater controller 104 and the air heater controller 104 can determine the temperature based upon the change in resistance. For example, the air heater controller 104 can maintain a look-up table that includes various resistance values and corresponding temperature values.

Other components, such as the air heater 106 and the starter 114 may be grounded through the engine 108 (in particular, the engine block) to the frame 116. As a result, the effective ground voltage seen by the air heater 106 is based on the resistance of the ground path back to the battery 112 multiplied by the current following that same ground path. Generally, the starter 114 is not being powered at the same time as the air heater 106.

Figure 2:
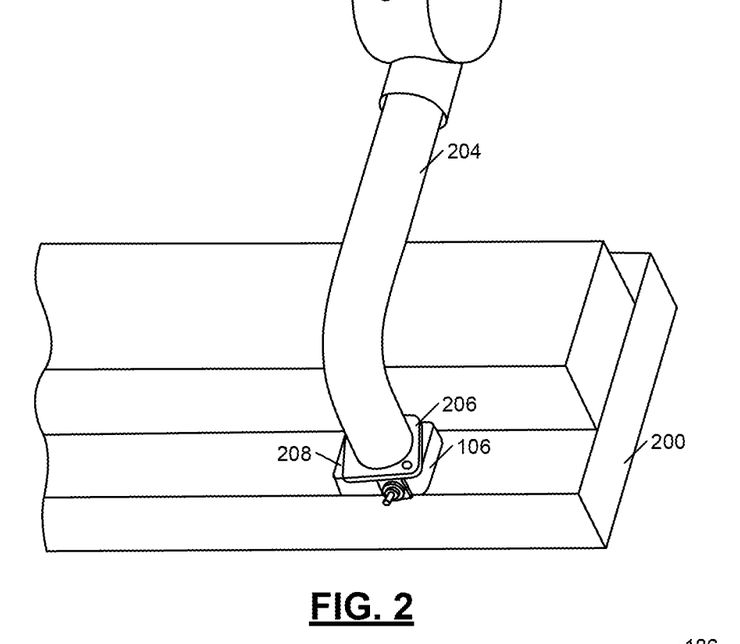
FIG. 2 is an isometric view of an intake manifold in thermal communication with an air heater according to the principles of the present disclosure.
Figure 3:
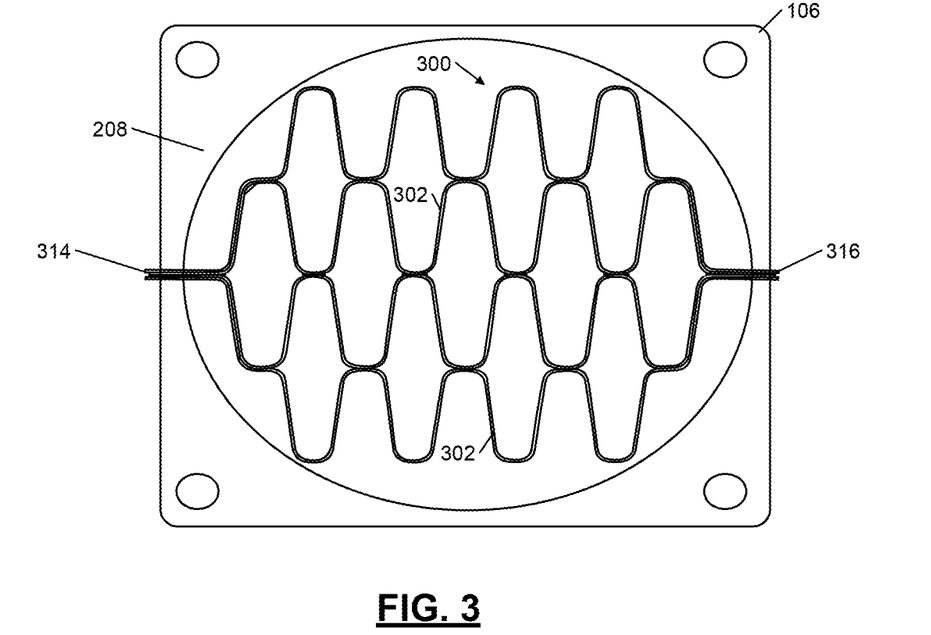
FIG. 3 is a side elevation view of a heater coil of the air heater retained within a frame according to the principles of the present disclosure.

Generally referring to FIGS. 2 through 5, an example air heater 106 is illustrated. As shown in FIG. 2, the air heater 106 is connected to and in thermal communication with an intake manifold 200. The air heater 106 is also connected to an air supply conduit 204 via a flange 206 and one or more fasteners, such as bolts, screws, or the like. As shown in FIGS. 2 and 3, the air heater 106 includes a housing 208 that retains the one or more heating elements 302 of the air heater.

Figure 4:
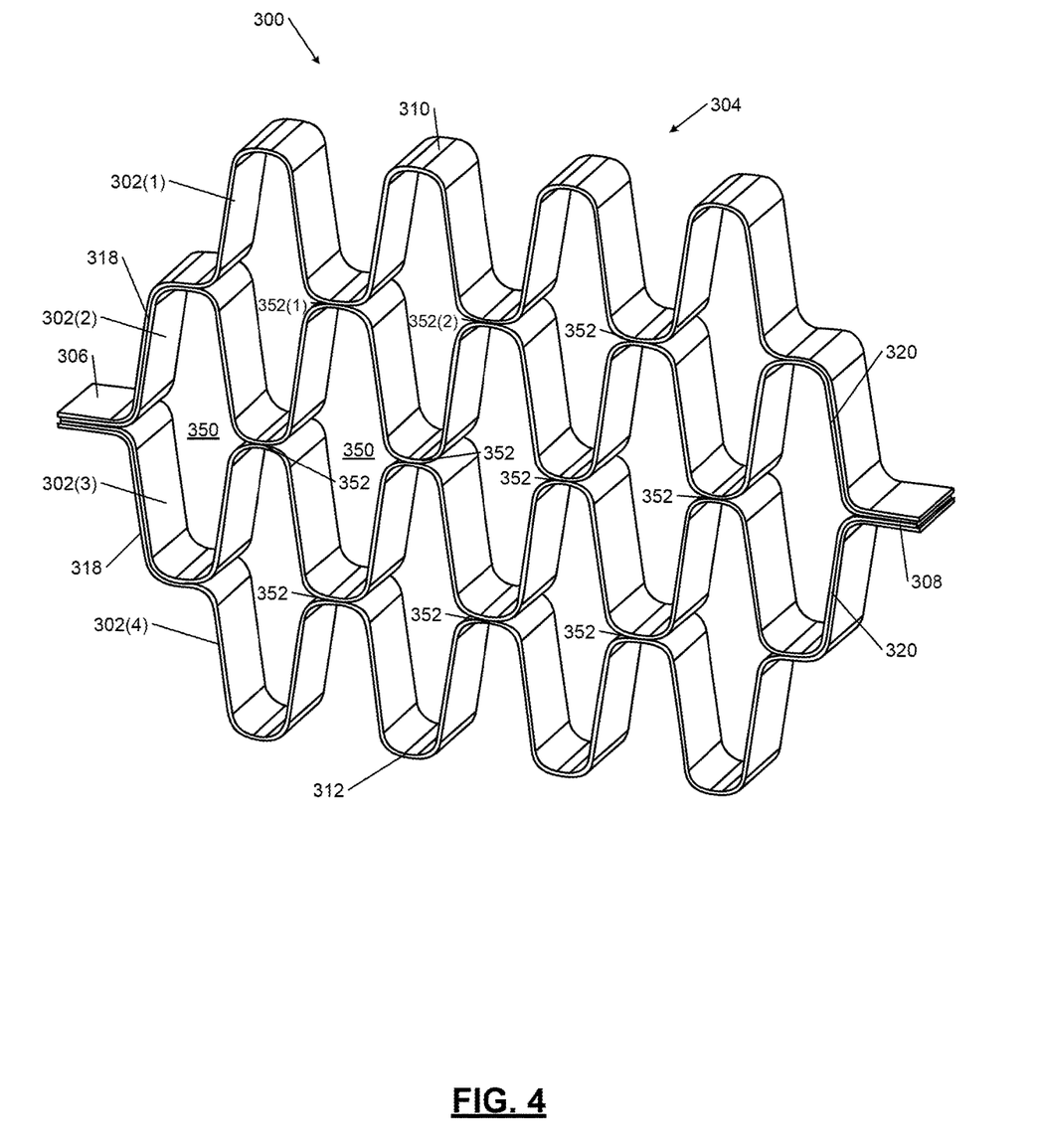
FIG. 4 is an isometric view of the heater coil of the air heater according to the principles of the present disclosure.
Figure 5:
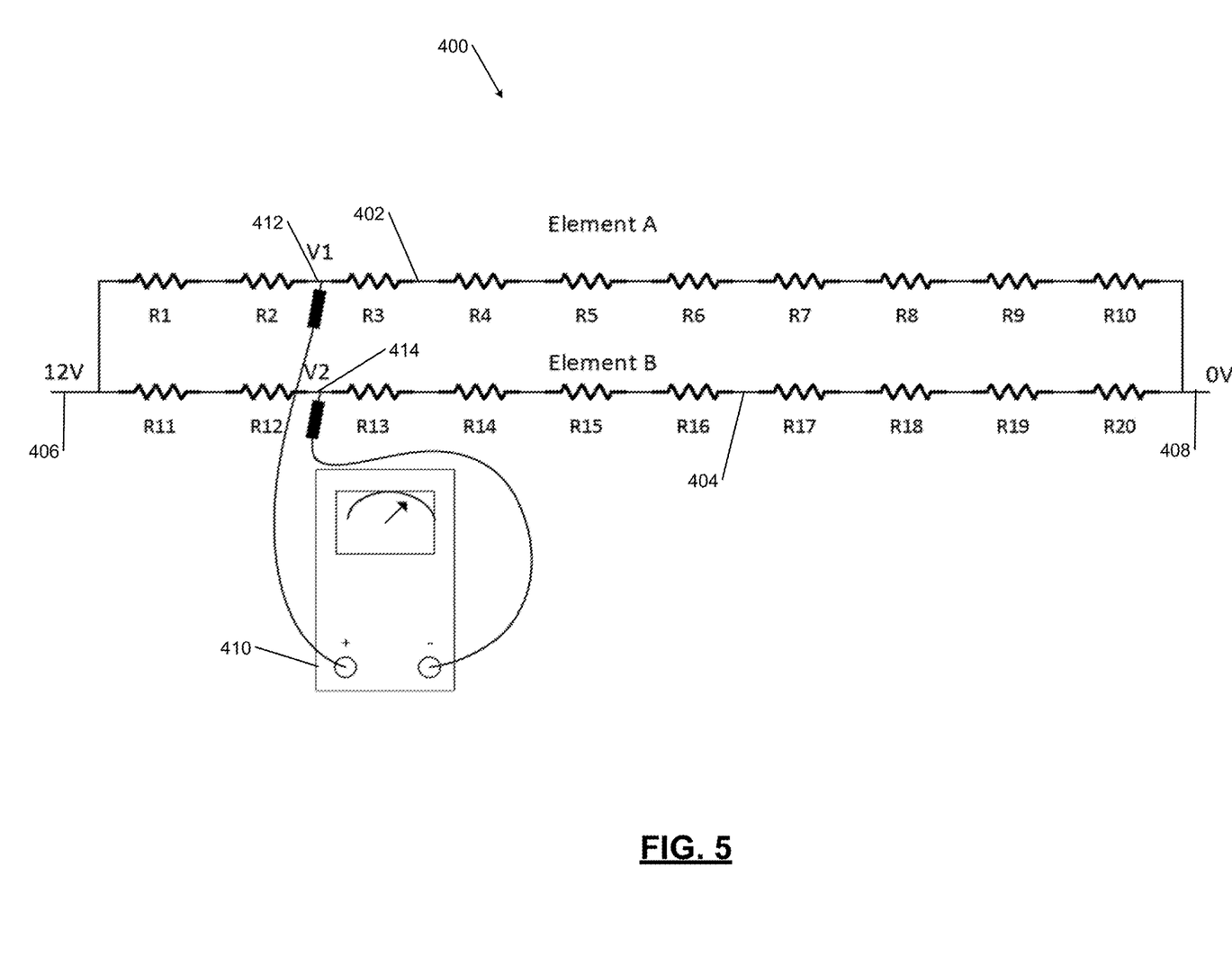
FIG. 5 is a diagrammatic schematic illustrating an example electrical interconnection according to the principles of the present disclosure.

The air heater 106 includes a heater coil assembly 300. The heater coil assembly 300 includes multiple heating elements 302, as shown in FIGS. 3 through 5. The heating elements 302 may be a suitable resistive material, such as a stainless steel material, a nichrome material, an iron-chromium-aluminum material, and the like, that generates heat when a voltage is applied to the air heater 106 due to current flowing through the heating elements 302. In one or more implementations, the respective heating elements 302 include multiple windings arranged in a serpentine configuration.

In some embodiments, the heating elements 302 may range in width from one centimeter to three centimeters (1 cm to 3 cm) and may range in length from thirty centimeters to fifty centimeters (30 cm to 50 cm) when arranged in the serpentine configuration. In some embodiments, the heating elements 302 may have a thickness ranging from twenty thousandths of a centimeter to thirty thousandths of a centimeter (0.02 cm to 0.03 cm). In an embodiment, the heating elements 302 have a width of two centimeters (2 cm), a length of forty centimeters (40 cm), and a thickness of twenty-five thousandths of a centimeter (0.025 cm).

The dimensional characteristics of the heating elements 302 serve to provide adequate support to the air heater 106. For instance, air heater 106 can be heated to approximately four hundred degrees Celsius (400° C.) in approximately three seconds (3 sec.). In this instance, the air heater 106 generates a sufficient amount of heat within a defined time period while maintaining the integrity of the structure. For example, the dimensional characteristics of the heating elements 302 allow the air heater 106 to generate a sufficient amount of heat for a specific time period without melting and/or deforming. Additionally, the dimensional characteristics of the heating elements 302 allow the air heater 106 to a desired wattage within a defined time period (i.e., generate a sufficient wattage within ten seconds, etc.).

As shown, the heating elements 302 are arranged in a honeycomb configuration, or a honeycomb structure 304. When assembled in the honeycomb configuration, the heating elements 302 define a plurality of apertures 350, or openings, that allow airflow to pass through. The airflow passing through the apertures 350 absorbs the heat generated by the air heater 106. In an implementation, the air heater 106 includes a first heating element 302(1), a second heating element 302(2), and third heating element 302(3), and a fourth heating element 302(4). Each heating element 302(1) through 302(4) includes a respective first end 306 and a respective second end 308. Once assembled in the honeycomb structure 304, the respective heating elements 302 (i.e., heating elements 302(1) through 302(4)) have at least substantially the same width, at least substantially the same length, and at least substantially the same thickness. Thus, in various embodiments, the respective heating elements 302(1) through 302(4) have at least substantially the same electrical resistance. The first heating element 302(1) and the fourth heating element 302(4) can be referred to as the exterior portions of the honeycomb structure 304. The second heating element 302(2) and the third heating element 302(3) can be referred to as the interior portions of the honeycomb structure 304. In some instances, the heating elements 302 may be selectively beveled to direct airflow in a preferred direction. Additionally, the honeycomb structure 304 may provide additional durability to mitigate the chances of the air heater 106 becoming inoperable due to vibrational forces.

Each heating element 302(1) through 302(4) includes a respective crest portion 310 and a respective trough portion 312. The crest portion 310 of each heating element 302 represents the highest point of the respective heating element 302 when formed in the serpentine configuration, and the trough portion 312 of each heating element 302 represents the lowest point of the respective heating element 302 when formed in the serpentine configuration. It is understood that the crest portion 310 and the trough portion 312 are interchangeable since the air heater 106 can be oriented at one hundred and eighty degrees (180°) in various implementations.

The respective first ends 306 converge to form a first end 314 of the honeycomb structure 304, and the respective second ends 308 converge to form a second end 316 of the honeycomb structure 304. During operation, the first end 314 and the second end 316 of the honeycomb structure 304 function as electrodes that connect with a battery 112.

Referring to FIG. 4, the respective crest portions 310 and the trough portions 312 are joined, or fastened, together to form respective interfaces 352. For example, the respective trough portions 312 of the first heating element 302(1) are fastened to the crest portions 310 of the second heating element 302(2); the respective trough portions 312 of the second heating element 302(2) are fastened to the crest portions 310 of the third heating element 302(3); the respective trough portions 312 of the third heating element 302(3) are fastened to the crest portions 310 of the fourth heating element 302(4). In one or more implementations, the respective crest portions 310 and corresponding trough portions 312 can be welded together or fastened with a suitable fastener, such as a rivet, a screw, a bolt, or the like. The respective first ends 306 and the respective second ends 308 of the heating elements 302 can be welded together or fastened with a suitable fastener. In various implementations, the heating elements 302(1) and 302(4) include overlapping portions 318, 320, 322, 324 that overlap a corresponding portion of the heating elements 302(2) and 302(3).

The air heater 106 is arranged within the housing 208 and in communication with the intake manifold 200 so that the air heater 106 provides uniform and adequate air heating to the engine 108. As described herein, the voltage drop at the respective interfaces 352, as well as in other portions (i.e., overlapping portions) that are fastened or adjacent to one another, is at least substantially zero. FIG. 5 illustrates a diagrammatic schematic of an electrical interconnection 400 representing the heater coil assembly 300 according to an example embodiment. The electrical interconnection 400 includes parallel electrical paths 402, 404 that include multiple resistance elements (i.e., R1 through R20). The electrical interconnection also includes a first electrode 406 and a second electrode 408. As shown, twelve volts is applied to the electrode 406. FIG. 5 illustrates an example voltmeter 410 that measures the electrical potential difference (i.e., voltage) at nodes 412, 414. Equation 1 models the voltage V1 measured at node 412:

$$V1=12(R3+R4+R5+R6+R7+R8+R9+R10)/(R1+R2+R3+R4+R5+R6+R7+R8+R9+R10) \qquad \text{EQN. 1}$$

Equation 2 models the voltage V2 measured at node 414:

$$V2=12(R13+R14+R15+R16+R17+R18+R19+R20)/(R11+R12+R13+R14+R15+R16+R17+R18+R19+R20) \qquad \text{EQN. 2}$$

Assuming that R1=R11, R2=R12, R3=R13, ..., R10=R20, then V1=V2. If V1=V2, no current flows from V1 to V2 even if the electrical paths were electrically connected (i.e., R1 is connected to R11, R2 is connected to R12, etc.). When the resistive elements are equal, equivalent points within the electrical interconnection 400 have the same voltage. Thus, the electrical paths 402, 404 can be electrically connected but function, or behave, as electrically isolated paths (i.e., parallel electrical paths). While FIG. 5 illustrates two electrical paths, it is understood that additional paths may be added without departing from the scope of the present disclosure. Additionally, FIG. 5 illustrates the electrical interconnection 400 as including twenty resistive elements. However, it is understood that additional or less resistive elements can be utilized in accordance with the scope of the present disclosure as described above.

Referring back to FIG. 4, the respective heating elements 302(1), 302(2), 302(3), and 302(4) each represent an electrical path having multiple resistive elements. In various embodiments, a length of each electrical path (i.e., 302(1), 302(2), 302(3), and 302(4)) measured from a first interface 352(1) to an adjacent second interface 352(2) is equivalent.

Thus, each electrical path as measured from an interface 352 to another adjacent interface 352 functions as a resistive element (i.e., a first interface 352 to a second interface 352 corresponds to R1, a second interface 352 to a third interface 352 corresponds to R2, etc.). When a voltage is applied at the ends 314, 316 from the battery 112, at least substantially the same amount of current flows through each heating element 302(1), 302(2), 302(3), and 302(4) with no voltage drop at the interfaces 352 since each electrical path functions as an electrically isolated path.

For example, since each heating element 302(1) to 302(4) has at least substantially the same equivalent resistance per unit length resulting in the same resistance. Consequently, the same current flows through the respective heating elements 302, and the voltage potentials caused by the currents times the resistance at the interfaces 352 is the same relative to insulated interfaces (i.e., a heater coil having insulating material disposed between a respective crest portion 310 and a respective trough portion 312). Thus, each electrical path (i.e., 302(1), 302(2), 302(3), 302(4)) within the heater coil assembly 300 functions, or behaves, as an independent, or parallel, electrical path with respect to the other electrical paths since there is no voltage drop between the fastened interfaces. When the interfaces 352 are welded together, the weld points are annealed during operation due to the heating and cooling cycles.

Figure 6:
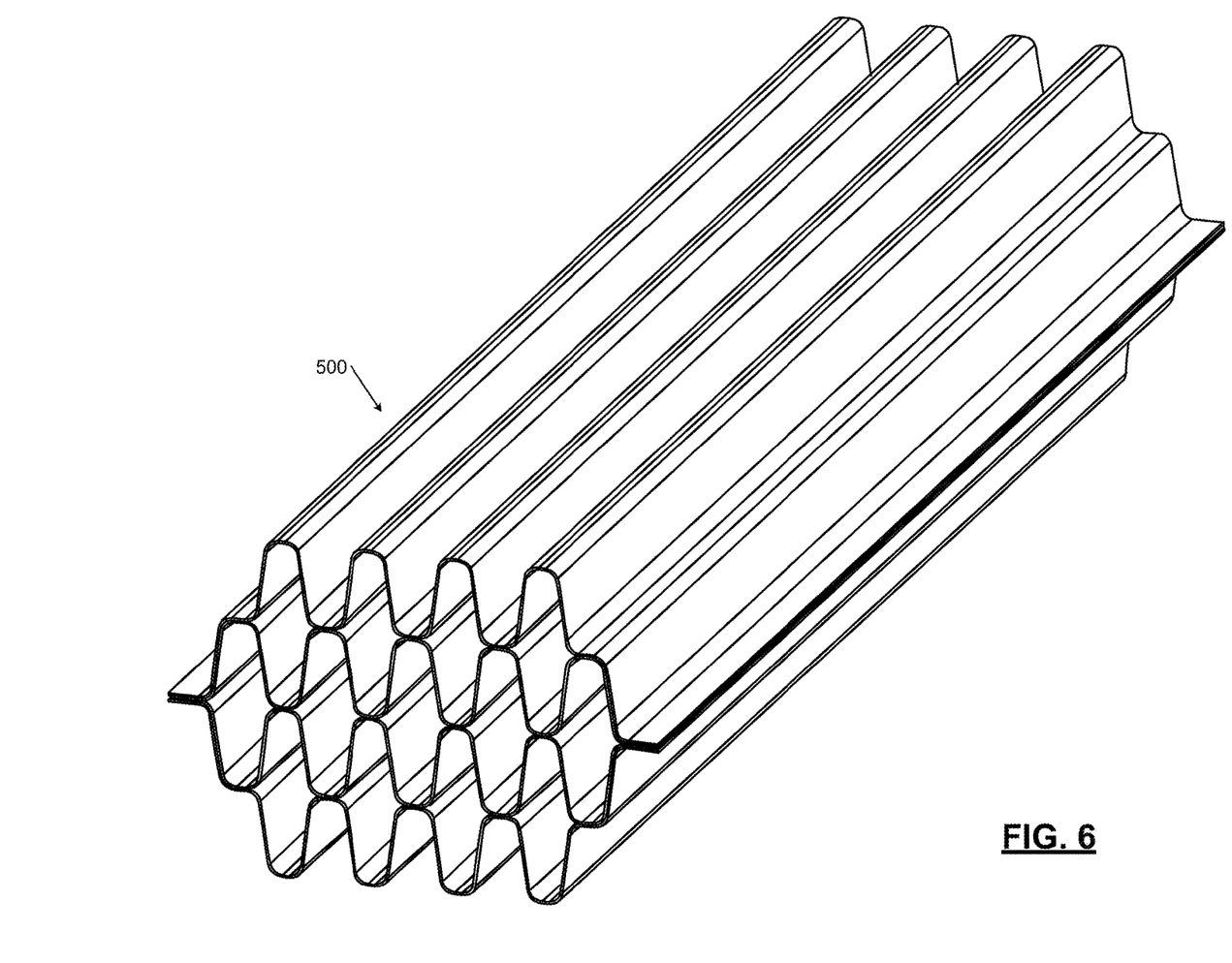
FIG. 6 is an isometric view of another heater coil of the air heater according to the principles of the present disclosure.

FIG. 6 illustrates an example structure 500, which includes elongated heating elements 302 arranged in a honeycomb configuration. For instance, a suitable material is manipulated to form a heating element 302 having a serpentine configuration, such as a material having multiple crest portions 310 and multiple trough portions 312. The heating element 302 is then joined with another heating element 302 to form interfaces 352. This process is continued until the heating elements 302 are assembled to form a honeycomb structure, such as the structure 400 illustrated in FIG. 6. The structure 500 can be segmented into multiple honeycomb structures 304 such that each segmented honeycomb structure 304 can utilized within an air heater 126.

Generally referring back to FIG. 1, during operation, the air heater controller 104 controls voltage provided to the air heater 106 by the battery 112. For example, the air heater controller 104 receives an enable signal to initiate operation of the air heater 106 from the engine controller 110. In response, the air heater controller 104 causes the battery 112 to provide a voltage signal to the air heater 106. For instance, the truck 102 includes electrical switches that selectively connect the battery 112 to the air heater 106. When a voltage is applied to the ends 314, 316, current flows through the air heater 106 to generate heat.

The air heater controller 104 receives the measured temperature from temperature sensor 118. The air heater controller 104 compares the measured temperature with a predefined temperature threshold. Once the measured temperature reaches or exceeds the predefined temperature threshold, the air heater controller 104 issues a control signal to prevent the battery 112 from providing further voltage to the air heater 106. In various embodiments, the voltage can then be used by the starter 114. In some instances, the air heater controller 104 allows the battery 112 to provide voltage to the air heater 106 while the starter 114 is using voltage from the battery 112. In these instances, the air heater controller 104 reduces the voltage provided to the air heater 106 until the air heater controller 104 determines that a peak starter current used to break static friction has been reached. Once the peak current has been reached, the air heater controller 104 can increase the voltage provided to the air heater 106 to reduce exhaust emissions while the engine operates.

Figure 7:
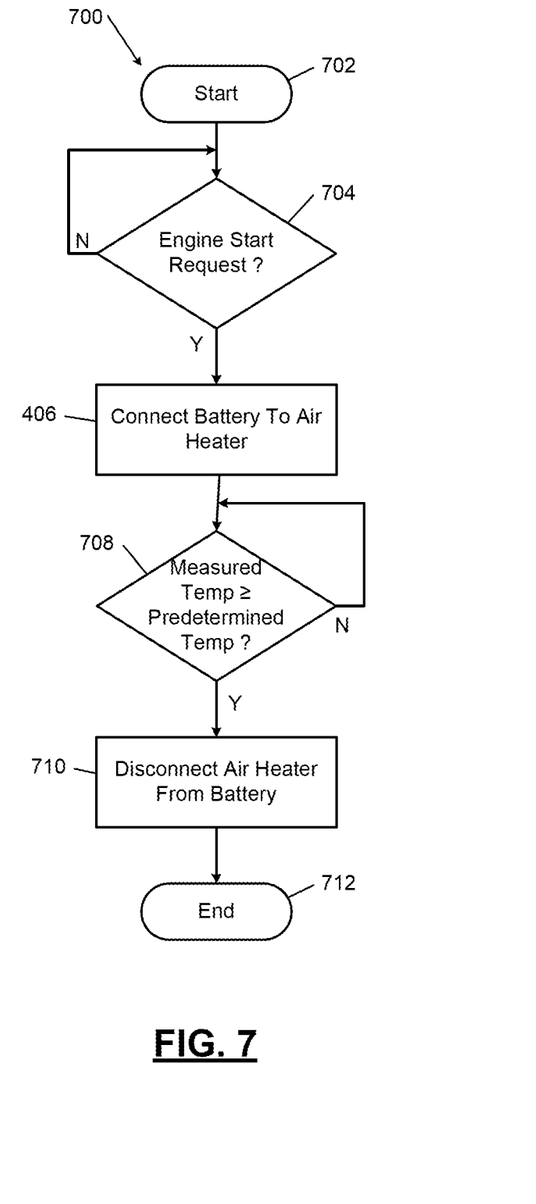
FIG. 7 is a flowchart illustrating an example method for controlling an intake air heating system according to the principles of the present disclosure.

In FIG. 7, an example operation related to engine starting for the engine controller begins at 700. The method begins at 702. At 704, a determination is made of whether a request to initiate operation of the engine 108 is received. For instance, the air heater controller 104 determines whether it has received an initiation signal from the engine controller 110.

At 706, the air heater controller 104 selectively connects the battery 112 to the air heater 106. For instance, the air heater controller 104 causes electric switches electrically connected between the battery 112 and the air heater 106 to transition from an open state to a closed state allowing the battery 112 to be electrically connected to the air heater 106. Additionally, the air heater controller 104 can initiate operation of the temperature sensor 118 to measure the temperature of the air heater 106. In some examples, the temperature sensor 118 is disposed directly on a heating element 302 of the air heater 106

At 708, the air heater controller 104 compares the measured temperature to a predetermined temperature. As described above, the air heater controller 104 can employ a look-up table to determine the temperature of the heating coil based upon the measured resistance. Once the measured temperature is equal to or exceeds the predetermined temperature, the air heater controller 104 selectively disconnects to the air heater 106 from the battery 112 at 710. At 712, the method 700 ends.

Figure 8:
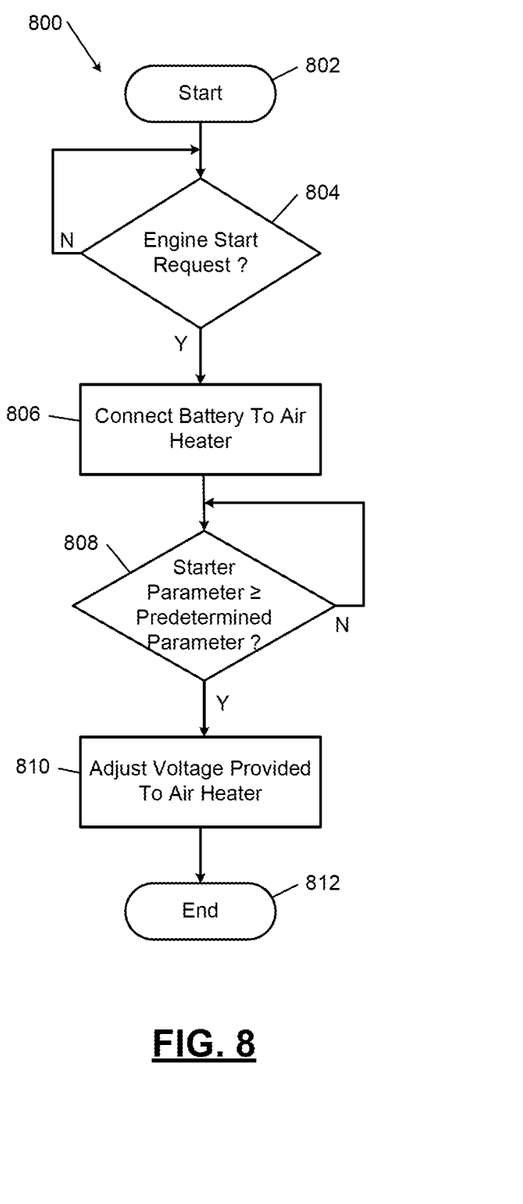
FIG. 8 is another flowchart illustrating another example method for controlling an intake air heating system according to the principles of the present disclosure.

In FIG. 8, an example operation related to engine starting for the engine controller begins at 800. The method begins at 802. At 804, a determination is made of whether a request to initiate operation of the engine 108 is received. At 806, the air heater controller 104 selectively connects the battery 112 to the air heater 106 at a predetermined voltage.

At 808, the engine controller 110 compares the peak starter current to a predetermined peak starter current. For example, the engine controller 110 monitors parameters for a starter 112. The engine controller 110 receives signals representing one or more starter 114 parameters (i.e., peak starter current, etc.) from a sensor associated with the starter 114. Once a starter parameter, such as peak starter current, is equal to or exceeds a predetermined starter parameter, such as a predetermined peak starter current, the engine controller 110 transmits a signal to the air heater controller 104 to adjust the voltage provided from the battery 112 to the air heater 106 at 810. For example, the voltage provided to the air heater 106 may be increased to increase the amount of current within the air heater 106 to shorten warm-up and reduce emissions. At 812, the method 800 ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:
1. An air heater assembly, comprising:
   a first heating element including a plurality of windings arranged in a serpentine configuration and including a plurality of crests and a plurality of troughs;

an individual second heating element including a plurality of windings arranged in a serpentine configuration, a plurality of crests and a plurality of troughs, at least one crest of the second heating element fastened to at least one trough of the first heating element at a first interface; and an individual third heating element including a plurality of windings arranged in a serpentine configuration and including a plurality of crests and a plurality of troughs, at least one crest of the third heating element fastened to at least one trough of the second heating element at a second interface, wherein the first heating element, the second heating element, and the third heating element are arranged in a honeycomb configuration, wherein the first heating element and the second heating element are electrically connected to each other at the first interface and behave as electrically isolated paths.

2. The air heater assembly of claim 1, wherein a length of the first heating element equals a length of the second heating element and a length of the third heating element and a resistance of the first heating element equals a resistance of the second heating element and a resistance of the third heating element.

3. The air heater assembly of claim 1, wherein a first end portion overlaps a second end portion for a distance from one of the crests of the second heating element to one of the troughs of the second heating element.

4. The air heater assembly of claim 1, wherein a thickness of the first heating element equals a thickness of the second heating element and a thickness of the third heating element, wherein the air heater assembly includes a double thickness of heating elements at the overlap of the first end portion and the second end portion.

5. The air heater assembly of claim 4, wherein the thickness of the first heating element comprises a range between twenty thousandths of a centimeter to thirty thousandths of a centimeter.

6. The air heater assembly of claim 2, wherein a width of the first heating element equals a width of the second heating element and a width of the third heating element.

7. The air heater assembly of claim 6, wherein the width of the first heating element comprises a range between one centimeter and three centimeters.

8. The air heater assembly of claim 1, wherein the first heating element, the second heating element, and the third heating element comprise stainless steel.

9. An air heater assembly comprising:
a first heating element and an individual second heating element each including a plurality of windings arranged in a serpentine configuration, each of the first and second heating elements including first and second opposite surfaces, a plurality of crests and a plurality of troughs, wherein one of the first and second opposite surfaces of the first heating element at one of the crests of the first heating element is in direct contacting engagement with one of the first and second surfaces of the second heating element at one of the troughs of the second heating element to form an interface, the first heating element being welded to the second heating element at the interface, the first and second heating elements being electrically connected to each other at the interface, functioning as parallel electrical paths and arranged to define a plurality of spaced apart apertures therebetween.

10. The air heater assembly of claim 9, wherein a thickness of each heating element comprises a distance between the first and second opposite surfaces, wherein a thickness of the first heating element is equal to a thickness of the second heating element.

11. The air heater assembly of claim 9, wherein each aperture is defined solely by the first and second opposite surfaces of the first and second heating elements.

12. The air heater assembly of claim 11, wherein the apertures are open and devoid of any other structure.

13. The air heater assembly of claim 9, wherein a voltage drop between the first heating element and the second heating element at the interface is substantially zero.

14. The air heater assembly of claim 9, wherein each of the first and second heating elements comprises 100% metal.

15. The air heater assembly of claim 14, wherein each of the first and second heating elements consists of stainless steel.

16. The air heater assembly of claim 9, wherein crests of the plurality of crests of the first heating element are welded to corresponding troughs of the plurality of troughs of the second heating element to form a plurality of interfaces.

17. An air heater assembly, comprising:
a plurality of individual heating elements, respective heating elements of the plurality of heating elements including a plurality of windings arranged in a serpentine configuration, the respective heating elements each including first and second opposite surfaces, a plurality of crests and a plurality of troughs, wherein crests of the plurality of crests of a first heating element are welded to troughs of the plurality of troughs of a second heating element, one of the first and second opposite surfaces of the first heating element being in direct contacting engagement with one of the first and second opposite surfaces of the second heating element to form a plurality of interfaces at the direct contacting engagement, the first heating element defining a first electrical path, the second heating element defining a second electrical path, the first and second electrical paths being electrically connected to each other at the plurality of interfaces but behaving as electrically isolated paths, the plurality of heating elements arranged in a honeycomb configuration, a volume of the first heating element extending between a first interface of the plurality of interfaces and a second interface of the plurality of interfaces being equal to a volume of the second heating element extending between the first interface and the second interface.

18. The air heater assembly of claim 17, wherein the resistance of the volume of the first heating element equals a resistance of the volume of the second heating element.

19. The air heater assembly of claim 17, further comprising apertures, wherein each aperture is defined solely by the first and second opposite surfaces of the first and second heating elements.

20. The air heater assembly of claim 19, wherein the apertures are open and devoid of any other structure.

* * * * *